United States Patent
Brunner et al.

(10) Patent No.: US 7,099,630 B2
(45) Date of Patent: Aug. 29, 2006

(54) BEAM FORMING METHOD

(75) Inventors: Christopher Brunner, Wittlich (DE);
Bernhard Raaf, Munich (DE);
Alexander Seeger, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 572 days.

(21) Appl. No.: 10/312,769

(22) PCT Filed: Jun. 29, 2001

(86) PCT No.: PCT/DE01/02405

§ 371 (c)(1),
(2), (4) Date: Dec. 30, 2002

(87) PCT Pub. No.: WO02/03565

PCT Pub. Date: Jan. 10, 2002

(65) Prior Publication Data

US 2003/0109226 A1 Jun. 12, 2003

(30) Foreign Application Priority Data

Jul. 4, 2000 (DE) ................................ 100 32 426

(51) Int. Cl.
*H04B 1/00* (2006.01)
*H04B 7/00* (2006.01)

(52) U.S. Cl. ..................................... 455/69; 455/562.1

(58) Field of Classification Search ............... 455/13.3, 455/83, 129, 269, 279.1, 69, 562.1, 575.7; 342/380, 378, 382, 383, 465
See application file for complete search history.

(56) References Cited

U.S. PATENT DOCUMENTS

| | | | |
|---|---|---|---|
| 5,634,199 A | 5/1997 | Gerlach et al. | |
| 5,982,327 A * | 11/1999 | Vook et al. | 342/380 |
| 5,999,131 A * | 12/1999 | Sullivan | 342/465 |
| 6,166,690 A * | 12/2000 | Lin et al. | 342/383 |
| 6,177,906 B1 | 1/2001 | Petrus | |
| 6,275,543 B1 * | 8/2001 | Petrus et al. | 375/324 |
| 6,317,612 B1 | 11/2001 | Farsakh | |
| 6,326,976 B1 * | 12/2001 | Huettner | 345/582 |
| 6,571,225 B1 * | 5/2003 | Oles et al. | 706/12 |

FOREIGN PATENT DOCUMENTS

| | | |
|---|---|---|
| DE | 198 03 188 A1 | 7/1999 |
| EP | 0 807 989 | 11/1997 |
| EP | 0 899 896 A1 | 3/1999 |
| EP | 0 948 145 | 10/1999 |

(Continued)

OTHER PUBLICATIONS

Paulraj et al., "Space-Time Processing for Wireless Communications", IEEE Signal Processing Magazine, Nov. 1997, pp. 50-83.

(Continued)

*Primary Examiner*—Edan Orgad
*Assistant Examiner*—Dominic E. Rego
(74) *Attorney, Agent, or Firm*—Staas & Halsey LLP

(57) ABSTRACT

A radio communications system has subscriber stations and a base station that is provided with an antenna system with a plurality of antenna elements that emit a downlink signal in a weighted manner with coefficients of a weighting vector. In order to form a beam, a plurality of weighting vectors is determined at the subscriber station and the determined weighting vectors are transmitted to the base station. In a subsequent working phase, the subscriber station selects a dominant vector among the determined weighting vectors and transmits an indicator of the selected weighting vector to the base station.

29 Claims, 7 Drawing Sheets

FOREIGN PATENT DOCUMENTS

| | | |
|---|---|---|
| EP | 0 999 658 A2 * | 5/2000 |
| WO | WO 98/00930 | 1/1998 |
| WO | WO 98/43106 | 10/1998 |
| WO | WO 00/36764 | 6/2000 |
| WO | WO 00/60764 | 10/2000 |
| WO | WO 01/31812 | 5/2001 |
| WO | WO 01/91323 | 11/2001 |

OTHER PUBLICATIONS

Schmalenberger et al., "A Comparison of Two Different Algorithms for Multi Antenna C/I Balancing", Sep. 1997, pp. 483-490.

Raitola et al., "Transmission Diversity in Wideband CDMA", IEEE, 1999, pp. 1545-1549.

U.S. Appl. No. 10/296,546, filed Apr. 3, 2003, Brunner et al.

"Adaptive Signal Processing by Means of Array Antennas," Kikuma (in German and Japanese).

* cited by examiner (Prior art)

| Time slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Short term | 1 | 1 | 1 | 1 | 1 | 1 | 1 | 1 | 1 | 1 | 1 | 1 | 1 | 1 | 0 |
| Long term | 0 | 0 | 0 | 0 | 0 | 0 | 0 | 0 | 0 | 0 | 0 | 0 | 0 | 0 | 1 |

| Time slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Short term | 1 | 1 | 1 | 1 | 0 | 1 | 1 | 1 | 1 | 0 | 1 | 1 | 1 | 1 | 0 |
| Long term | 0 | 0 | 0 | 0 | 1 | 0 | 0 | 0 | 0 | 1 | 0 | 0 | 0 | 0 | 1 |

| Time slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Short term | 0 | 0 | 0 | 0 | 0 | 0 | 0 | 0 | 0 | 0 | 0 | 0 | 0 | 0 | 0 |
| Long term | 1 | 1 | 1 | 1 | 1 | 1 | 1 | 1 | 1 | 1 | 1 | 1 | 1 | 1 | 1 |

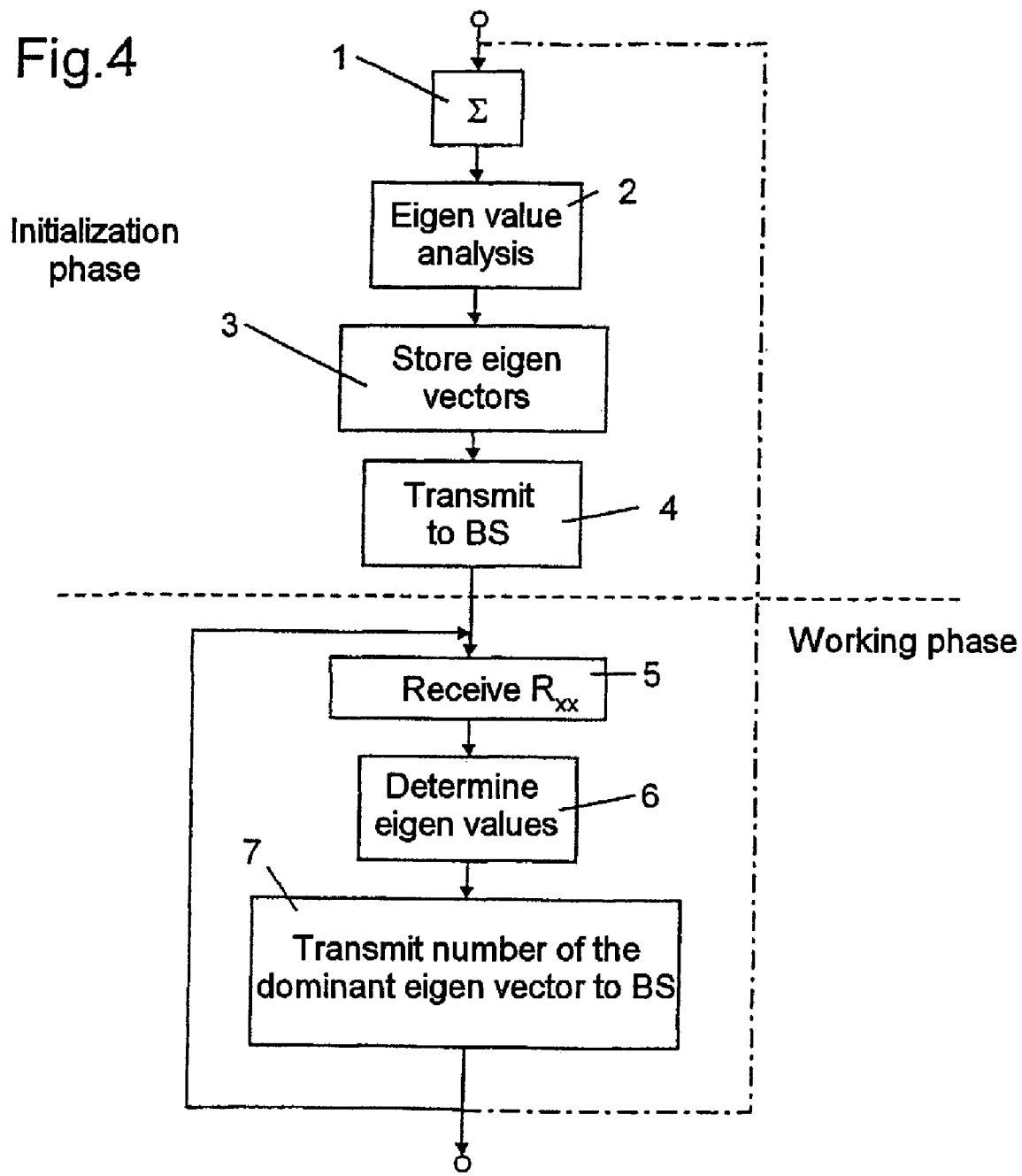

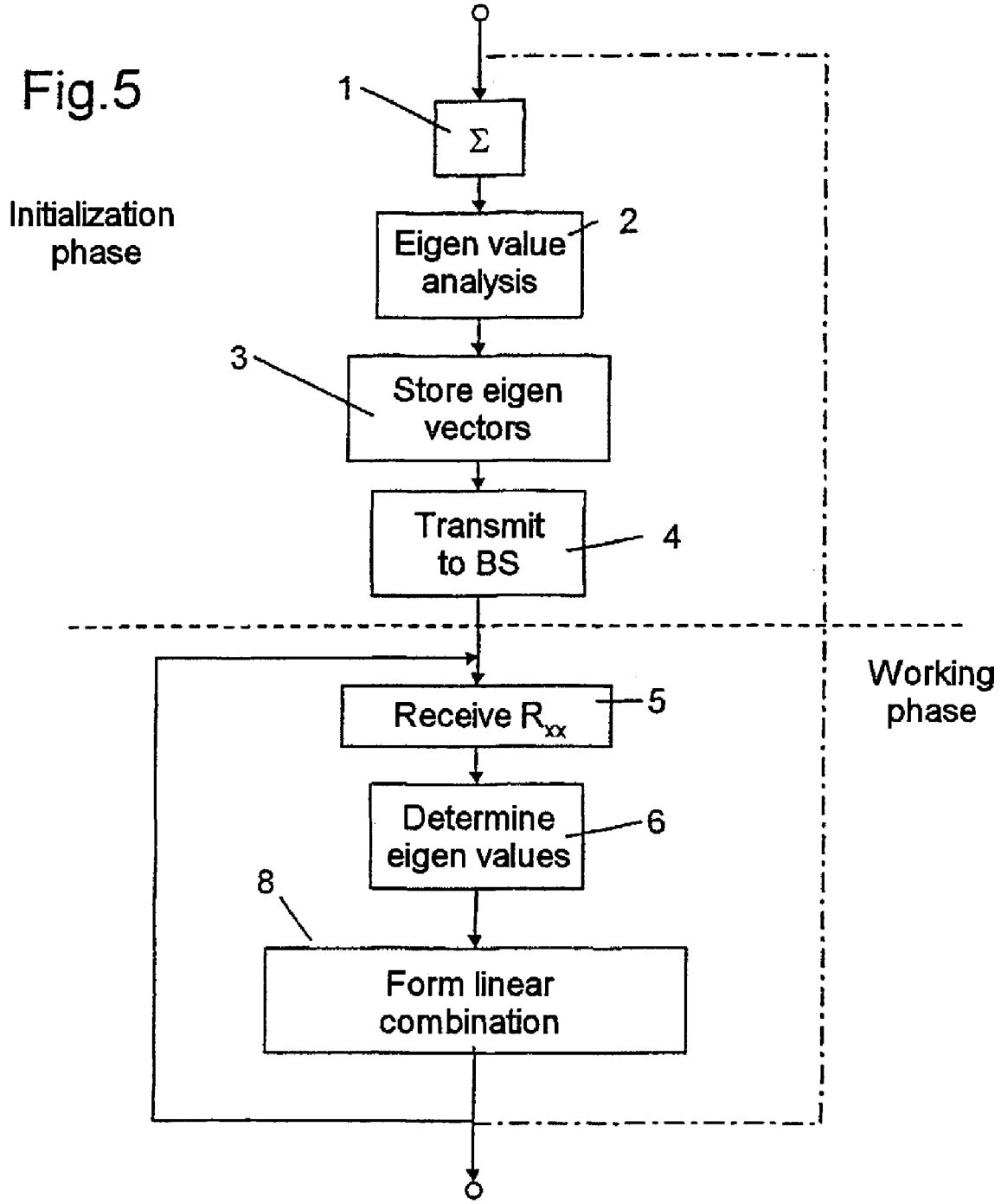

BEAM FORMING METHOD

CROSS REFERENCE TO RELATED APPLICATIONS

This application is based on and hereby claims priority to PCT Application No. PCT/DE01/02405 filed on 29 Jun. 2001 and German Application No. 100 32 426.6 filed on 4 Jul. 2000, the contents of which are hereby incorporated by reference.

BACKGROUND OF THE INVENTION

The invention relates to a method for beamforming in a radio communications system having a base station whose associated antenna device has a number of antenna elements, so that spatial resolution is possible in the beamforming.

In radio communications systems, messages (speech, picture information or other data) are transmitted via transmission channels by electromagnetic waves (radio interface). The transmission takes place both in the downlink direction from the base station to the subscriber station and in the uplink direction from the subscriber station to the base station.

Signals which are transmitted using electromagnetic waves are subject, inter alia, to disturbances due to interference during their propagation in a propagation medium. Disturbances caused by noise may be caused, inter alia, by noise in the input state of the receiver. Due to diffraction and reflections, signal components pass over different propagation paths. Firstly, this means that a signal can arrive at the receiver more than once, in each case from different directions, with different delays, attenuations and phase angles, and, secondly, components of the received signal may be superimposed coherently with changing phase relationships in the receiver, leading to cancellation effects on a short-term timescale (fast fading) there.

DE 197 12 549 A1 discloses the use of intelligent antennas (smart antennas), that is to antenna arrangements having a number of antenna elements, in order to increase the transmission capacity in the uplink direction. These allow the antenna gain to be deliberately aligned in a direction from which the uplink signal is coming.

Various methods for spatial signal separation for the uplink and downlink directions are known from A. J. Paulraj, C. B. Papadias, "Space-time processing for wireless communications", IEEE Signal Processing Magazine, November 1997, pages 49–83.

Particular difficulties occur in the downlink direction, that is to say from the base station to the subscriber station, since the beamforming has to be carried out before the transmitted signals are influenced by the radio channel. An algorithm for beamforming in the downlink direction is known from R, Schmalenberger, J. J. Blanz, "A comparison of two different algorithms for multi antenna C/I balancing", Proc. 2nd European Personal Mobile Communications Conference (EPMCC), Bonn, Germany, September 1997, pages 483–490, which is based on a direct propagation path (visual link) between the base stations and the subscriber stations and iterative calculation of beamforming vectors. The entire, complicated, iterative calculation must be repeated whenever the characteristics of the transmission channel change.

DE 198 03 188 A discloses a method in which a spatial covariance matrix is defined for a link from a base station to a subscriber station. An eigen vector is calculated in the base station from the covariance matrix, and is used as a beamforming vector for that link. The transmission signals for the link are weighted with the beamforming vector and are supplied to antenna elements for emission. Intracell interference is not included in the beamforming process owing to the use of joint detection, for example in the terminals, and any corruption of the received signals by intercell interference is negligible.

In an environment with multipath propagation, this method clearly determines a propagation path with good transmission characteristics and concentrates the transmission power of the base station physically on this propagation path. However, using this approach, it is impossible to prevent the possibility of interference on this transmission path leading to signal cancelation, and hence to interruptions in the transmission, in the short term.

The recommendations from the 3GPP (3rd Generation Partnership Project, http://ww.3gpp.org) therefore provide methods in which the subscriber station estimates a short term channel impulse response $h_m$ for the channel from the m-th antenna element to the subscriber station, and calculates weighting factors $w_m$ which intended to be used for weighting the transmission signal before it is transmitted by the m-th antenna element. Corresponding concepts are also dealt with in M. Raitola, A. Hottinen and R. Wichmann, "Transmission diversity in wideband CDMA", which appeared in the Proceedings of the 49th IEEE Vehicular Technology Conf. Spring (VTC 99 Spring), pages 1545–1549, Houston, Tex. 1999.

One serious problem with this procedure is that the vector of the weighting factors which is estimated by the subscriber station must be transmitted to the base station and that, in accordance with the Recommendations from the 3GPP, only a narrow bandwidth of 1 bit per time slot (slot) is available for this purpose. The vectors can thus be transmitted in only a coarsely quantized form. If the channel changes quickly and the weights need to be updated from one time slot to the next, only two different relative phase angles of the antenna elements can be set. If the channel is changing relatively slowly and, for example, four time slots are available for transmission of the vector, 16 different values of the vector can then be represented.

However, the known concepts reach their limits when the number of antenna elements at the base station is greater than 2, since the bandwidth which is required for transmission of the vector increases with its number of components, that is to say with the number of antenna elements. This means that, although a large number of antenna elements would be desirable on the one hand in order to make it possible to align the transmission beam as accurately as possible, the limited available bandwidth on the other hand means that the weighting vector cannot be updated sufficiently often as would be necessary for matching to fast fading.

SUMMARY OF THE INVENTION

One aspect of the invention is based on the object of specifying an improved method for beamforming which allows more reliable forming of the downlink beam.

The proposed method for data transmission is used in a radio communications system having a base station and subscriber stations. The subscriber stations are, for example, mobile stations, that is to say in a mobile radio network, or fixed stations, that is to say in so-called subscriber access networks for wire-free subscriber access. The base station has an antenna device (smart antenna) with a number of antenna elements. The antenna elements allow directional reception and directional transmission of data via the radio interface.

The method according to one aspect of the invention distinguishes between an initialization phase, which is in each case carried out at relatively long time intervals corresponding to a large number of time slots for the relevant subscriber station, and a working phase, whose steps are carried out more frequently, for example up to once per time slot. In the initialization phase, a number of so-called first weighting vectors are determined, which are used in a subsequent working phase in the radio communications system in order to define a current weighting vector, which is actually used for beamforming, as new in each case, for each cycle of the working phase. The processing complexity associated with the determination of the weighting vectors thus occurs only relatively rarely, in the initialization phases; the definition of the current weighting vector, which, for example, requires only a choice or the formation of a linear combination of the first weighting vectors, can in contrast be carried out as frequently as necessary in order to compensate for transmission interruptions caused by fast fading.

Where the terms initialization phase and working phase are used here, these terms should not be understood as meaning that these phases relate to two processes which are separated in time and are carried out successively. In fact, they are two process elements of the method, which may be carried out continually and with time constraints. Although the results of the initialization phase are used in the working phase, the procedures from the initialization phase are, however, expediently carried out at the same time as those for the working phase in order that continually updated values of the first weighting vectors are available for the working phase.

Bearing in mind the fact that the weighting vectors change only slowly, if at all, during the existence of a call connection between a subscriber station and a base station, and that the compensation for fast fading is intended to be carried out at short time intervals by switching or changing weights for weighting vectorsat the base station, the information which is transmitted in the initialization phase to the base station, relating to the components of the weighting vectors, is also referred to as long-term feedback information, and that which is transmitted in the working phase is referred to as short-term feedback information.

At an early stage in the method, before the initialization phase has been carried out for the first time, it would, strictly speaking, be impossible for the working phase to be used, and it would thus still be impossible to interchange data between a terminal and a base station. This situation can be overcome by initially carrying out the working phase on the basis of arbitrarily predetermined values of the first weighting vectors.

For sake of simplicity, the predetermined weighting vectors which may be assumed are those which, apart from a component that does not disappear, preferably with the value 1, have only components with the value 0.

A first preferred refinement of the method provides for the first weighting vectors to be determined on the basis of measurements of the downlink transmission. This procedure is particularly expedient for radio communications systems which use different frequencies for the uplink and downlink since, in radio communications systems such as these, fast signal fading at the different frequencies is not correlated. Furthermore, steps in the method according to the preferred refinement, which are carried out both for determining the first weighting vectors in the initialization phase and for redefinition of the current weighting vectors in the working phase, therefore need be carried out only at the subscriber station. This avoids the processing complexity being duplicated, and circuit components for carrying out the method need also be provided only once, at the subscriber station.

In this case, the first weighting vectors determined at the subscriber station are expediently transmitted to the base station in the initialization phase, and the redefinition of the current weighting vector is carried out in the working phase, by the subscriber station selecting a dominant weighting vector from the determined first weighting vectors and transmitting a designation of the selected dominant weighting vector to the base station. Since this transmission need not take place in each individual time slot of the subscriber station, a dedicated channel can be allocated to it at times, or the transmission of user data such as speech from the subscriber station to the base station can be interrupted or constrained in individual time slots, in order to create transmission bandwidth for the transmission of the weighting vectors. These weighting vectors can thus be transmitted with considerably better resolution than is possible with the known methods, with the transmission bandwidth of 1 bit per time slot. Alternatively, the weighting vectors may also be transmitted time-division multiplexed with the designations. In this case, the ratio of the number of the time slots in which designations of the weighting vectors are transmitted to those in which information relating to new or changed values of the components of the weighting vectors is transmitted is preferably defined dynamically as a function of the speed of the subscriber station. For example, in a situation where the subscriber station is not moving, when fading has no influence or only a minor influence on the transmission quality of the individual propagation paths, or when a subscriber station is moving extremely fast, when the transmission qualities of the transmission paths change quickly, such that the beamforming cannot be readjusted sufficiently quickly, information relating to the components of the eigenvectors is transmitted predominantly or exclusively, while designations are predominantly transmitted at lower speeds. The weighting vectors in each case correspond to emission directions of the antenna device of the base station. Fast fading can admittedly lead to short-term adverse effects on the transmission on such a directional propagation path; the directions themselves in which the downlink signal must be emitted in order to reach the subscriber station will change only slowly, however, even if the subscriber station is moving, for example over a time scale of seconds to minutes. The weighting vectors which are transmitted to the base station can thus be used over a time period of appropriate length for the beamforming, even if the weighting vectors at any given time do not all allow high-quality transmission. If the transmission quality of a weighting vector which is used at a given time deteriorates, the base station must change at short notice to a different weighting vector which allows satisfactory transmission, or the best possible transmission. This weighting vector is in this case referred to as a dominant weighting vector. Since the individual coefficients of this weighting vector are already known at the base station, they no longer need be transmitted individually in the working phase, and it is sufficient to transmit only one designation which allows the base station to select the dominant weighting vector desired by the subscriber station from those stored in it, and to use this for transmission. The amount of information which is required for transmitting such a designation is completely independent of the resolution with which the coefficients of the weighting vectors have been transmitted in the initialization phase, and it is also independent of the number of coefficients of each vector, that is to say it is independent of the number of antenna elements in the antenna device at the base station. This amount of information increases only logarithmically with the number of weighting vectors which are transmitted to the base station. This means that high-precision beamforming is possible in the working phase of the subscriber station, with a minimal bandwidth requirement for transmission of the designation.

A first spatial covariance matrix of the received downlink signal is preferably produced in the initialization phase, and eigen vectors of this first covariance matrix are determined, and are transmitted as weighting vectors to the base station.

This first covariance matrix can be produced as standard for the entire downlink signal received by the subscriber station. Since the individual components of the downlink signal received by the subscriber station differ not only in the path that they have traveled but also in the delay time required for this path, it is more appropriate for the first covariance matrix to be produced individually for each tap of the downlink signal.

Those eigen vectors of the totality of eigen vectors of the first covariance matrix or matrices which have the highest eigen values are preferably determined, since these correspond to the propagation paths with the least attenuation.

In order to obtain a representative conclusion about the quality of the individual transmission paths, it is also expedient for each first covariance matrix to be averaged over a large number of time slots in the downlink signal.

In order to determine that weighting vector which is the most suitable at any given time in the operating phase, a second spatial covariance matrix is preferably produced, and the eigen vector that is chosen from the determined eigen vectors as being the dominant weighting vector is that which has the highest eigen value with the second covariance matrix. This second spatial covariance matrix may be produced from new, for example for each time slot allocated to the subscriber station.

In order to make it possible to distinguish between the components from the individual antenna elements when producing the covariance matrices, it is expedient for each antenna element to periodically emit a training sequence, which is known to the subscriber station and is orthogonal with respect to the training sequences of the other antenna elements, and for the weighting vectors to be determined on the basis of the training sequences received by the subscriber station.

One specific refinement allows the number of determined weighting vectors to be two; in this case, one bit is sufficient to identify the respectively dominant weighting vector in the working phase, and this bit can be transmitted in each time slot allocated to the subscriber station.

A greater number of weighting vectors can also be determined, preferably a power of $2^n$, in which case n bits are required to identify the dominant weighting vector. The transmission of this designation can be distributed over a number of time slots; if a bits are available for transmission in each time slot, n/a time slots are required, and the weighting vector which is specified by the designation is inserted into the n/a time slots which immediately follow the complete transmission of the designation.

A second preferred refinement allows the first weighting vectors to be determined on the basis of measurements of the uplink transmission. This procedure has the advantage that there is no need to transmit the coefficients of the first weighting vectors from the subscriber station to the base station. A method such as this is therefore more compatible with existing mobile radio systems, which do not provide such transmission.

Although the fast fading in mobile radio systems which use different frequencies for the uplink and downlink is different for the two transmission directions, this does not, however, have any disturbing influence on the determination of the first weighting vectors, if the latter are obtained by time averaging, in particular on the basis of an averaged covariance matrix.

In this case as well, it is preferable for the first weighting vectors in each case to be eigen values of a covariance matrix, since these eigen values in each case correspond to an individual propagation path for the radio signal which is interchanged at the same time, possibly on a number of different paths, between the base station and the subscriber station. If a direct propagation path (LOS, line of sight) exists between the subscriber station and the base station, which the base station can determine from the reception statistics of the uplink signal, then it is sufficient for it to transmit the downlink signal weighted with a single weighting vector corresponding to this transmission path. In this way, the transmission power of the base station is specifically directed at the direct transmission path, while other transmission paths of poorer quality are not deliberately supplied with transmission power.

If there is no direct transmission path, a linear combination of first weighting vectors may be used as the current weighting vector. This corresponds to deliberately sharing of the transmission power of the base station between a limited number of transmission paths corresponding to the number of current weighting vectors included in the linear combination. If, in a situation such as this, one of the transmission paths fails at short notice due to fast fading, there is a high probability that at least one other weighting vector in the linear combination will correspond to a transmission path whose quality is useable. This is particularly true when the first weighting vectors are the eigen vectors of the covariance matrix since, with these first weighting vectors, the probabilities of destructive interference are statistically uncorrelated.

In order to achieve as good a signal-to-noise ratio as possible during such a transmission using a linear combination of eigen vectors, the coefficients of the linear combination for a first weighting vector may be chosen to be greater the greater its eigen value.

If the downlink signal delay is identical on two transmission paths, the subscriber station is unable directly to keep these two transmission paths for the signal received by it separate from one another. It is thus possible for these two components to be in antiphase at the subscriber station location, and hence to cancel one another out. Such mutual cancelation can be reliably avoided by producing a number of downlink signals at the base station from a user data sequence intended for that subscriber station, which downlink signals each have a different space time block coding, and each of these downlink signals is transmitted weighted with a different current weighting vector. In this way, each propagation path has a characteristic associated space time block coding, which makes it possible to distinguish between the components of the different transmission paths in all circumstances.

The current weighting vector, with which the base station passes a downlink signal with a weighting to the antenna elements, need not necessarily be identical to one of the determined first weighting vectors; it may also be a linear combination of a number of first weighting vectors. In a method such as this, beamforming can be carried out on the basis of short-term feedback information which is transmitted from the subscriber station to the base station, for example by the subscriber station transmitting to the base station information relating to the weighting coefficients of the linear combination rather than the designations of the eigen vectors to be used. This information may include details about the magnitude and, in particular, about the phase of the weighting coefficients. This makes it possible for a base station to coordinate two or more first weighting vectors in terms of phase and, if appropriate, amplitude, so as to maximize the SNR (Signal to Noise Ratio) at the subscriber terminal.

The weighting vectors which are determined by a subscriber station can be transmitted to the base station by in each case transmitting the values of their individual components successively to the base station. The amount of data required to do this, and hence also the time required for transmission, depend on the resolution with which the weighting vectors are determined and transmitted. Such component-by-component transmission is expedient when the vectors determined by the subscriber station must be transmitted for the first time in an early stage of the link between the subscriber station and the base station.

If the base station has a set of weighting vectors and the initialization phase is repeated in order to determine up-to-date values of the first weighting vectors (which is sensibly done on a rota), then it is possible to save a quite considerable amount of transmission bandwidth for the transmission of the long-term feedback information by in each case now transmitting only the change in the components from the previous value of this vector from the subscriber station to the base station, rather than the values of the components of a currently determined first weighting vector, which change is added in the base station to the value determined in the previous initialization phase. The current value of the first weighting vector recovered at the base station in this way may have considerably better resolution than that corresponding to the transmitted number of bits.

In a limit situation, the difference formation process can be restricted by forming the mathematical sign of the difference between the value determined in the current initialization phase and a value determined in a previous initialization phase, for each component of the first weighting vector, by transmitting the mathematical signs to the base station, and by incrementing or decrementing each component of the first weighting vector stored there, by one unit, depending on the transmitted mathematical sign.

In this case, it is irrelevant where the complex-value components of the first weighting vectors are handled in a Cartesian representation or in a polar representation internally in the subscriber station and in the base station. Although the difference between two complex values in the polar representation does not generally correspond to the pair of numbers formed by the differences between the magnitude component and the phase component, in the application under consideration here, the updating of the weighting vector at the base station can also be carried out by transmitting this pair of numbers and their component-by-component addition to form a weighting vector, in a polar representation, at the base station.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 shows a flowchart of the method according to a first refinement;

FIG. 5 shows a flowchart of the method according to a second refinement;

DETAILED DESCRIPTION OF THE PREFERRED EMBODIMENT

Figure 1:
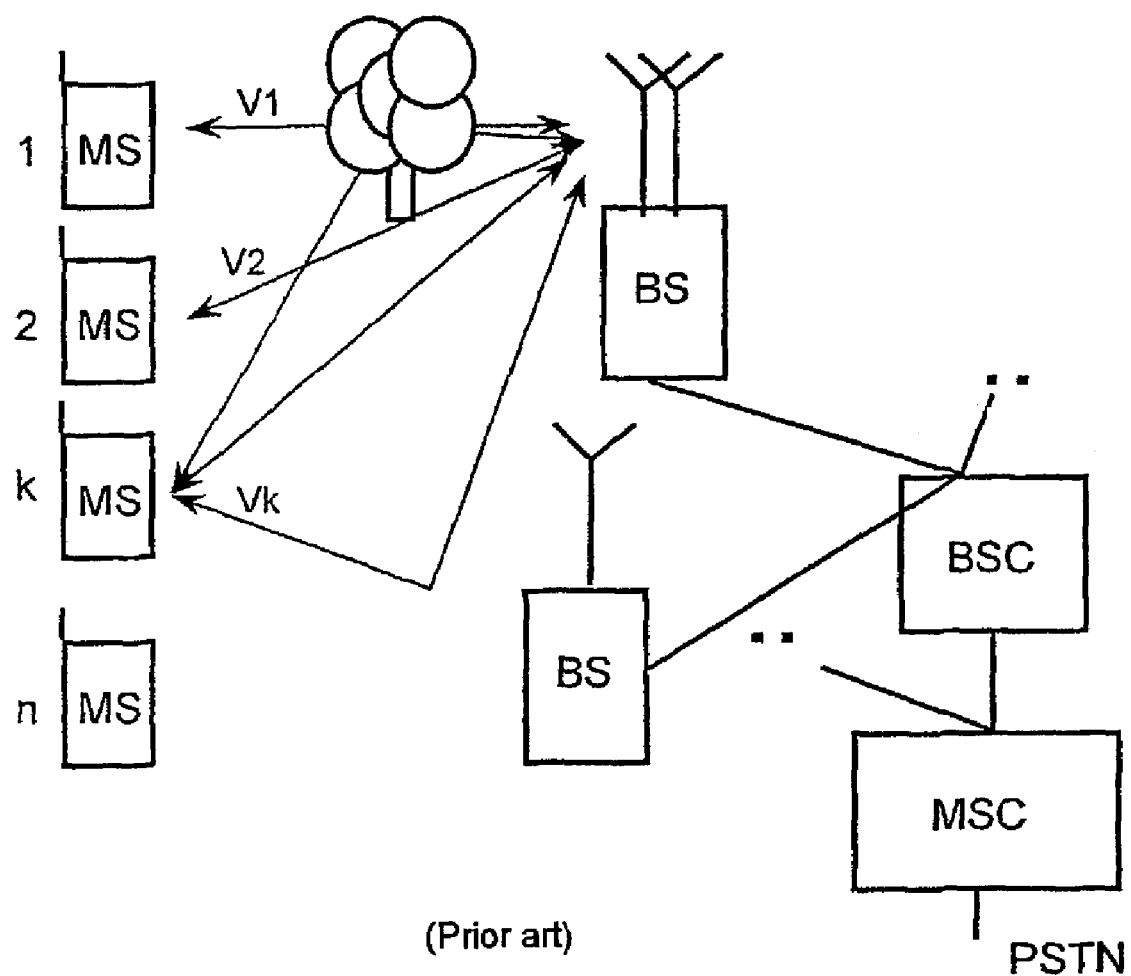
FIG. 1 shows a block diagram of a mobile radio network.

Reference will now be made in detail to the preferred embodiments of the present invention, examples of which are illustrated in the accompanying drawings, wherein like reference numerals refer to like elements throughout.

FIG. 1 shows the structure of a radio communications system in which one aspect of the invention can be used. This comprises a large number of mobile switching centers MSC, which are networked with one another and provide the access to a landline network PSTN. Furthermore, these mobile switching centers MSC are connected to in each case at least one base station controller BSC. Each base station controller BSC in turn allows a connection for at least one base station BS. A base station BS such as this can set up a message link to subscriber stations MS via a radio interface. At least some of the base stations BS are for this purpose equipped with antenna devices AE which have a number of antenna elements ($A_1$–$A_M$).

FIG. 1 shows, by way of example, connections V1, V2, Vk for transmitting user information and signaling information between subscriber stations MS1, MS2, MSk, MSn and a base station BS. An operation and maintenance center OMC provides control and maintenance functions for the mobile radio network, or for parts of it. The functionality of this structure can be transferred to other radio communications systems, in particular for subscriber access networks with wire-free subscriber access.

Figure 2:
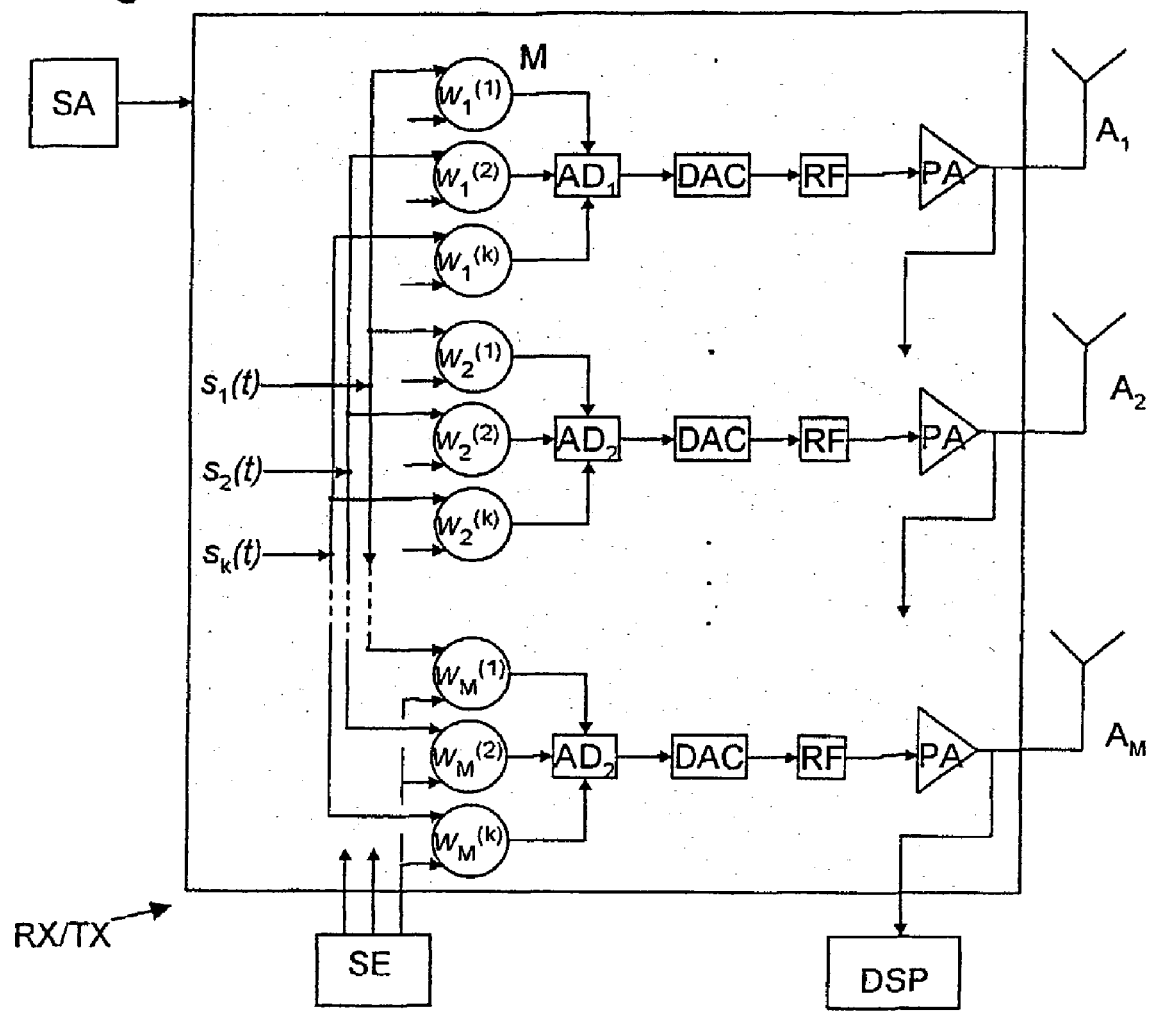
FIG. 2 shows a block diagram of the base station.

FIG. 2 shows, schematically, the design of a base station BS. A signal production device SA assembles the transmission signal, which is intended for the subscriber station MSk, into radio blocks, and allocates this signal to a frequency channel TCH. A transmitting/receiving device TX/RX receives the transmission signal $s_k(t)$ from the signal production device SA. The transmitting/receiving device TX/RX comprises a beamforming network, in which the transmission signal $s_k(t)$ for the subscriber station MSk is logically linked with transmission signals $s_1(t)$, $s_2(t)$, ... which are intended for other subscriber stations and to which the same transmission frequency is allocated. For each subscriber signal and each antenna element, the beamforming network has a multiplier M, which multiplies the transmission signal $s_k(t)$ by a component $w_m^{(k)}$ of a weighting vector $w^{(k)}$, which is allocated to the receiving subscriber station MSk. The output signals from the multipliers M which are in each case allocated to one antenna element $A_m$, m=1, . . . , M are added by an adder $AD_m$, m=1, 2, . . . , M, are converted to analog form by a digital/analog converter DAC, are converted to the transmission frequency (RF) and are amplified in a power amplifier PA before they reach the antenna element ($A_1$, . . . , $A_M$). A structure which is analogous to the described beamforming network but is not shown specifically in the figure is arranged between the antenna elements ($A_1$, $A_2$, . . . , $A_M$) and a digital signal processor DSP, in order to break down the received mixture of uplink signals into the components for the individual subscriber stations, and to supply these separately to the DSP.

A memory device SE contains a set of weighting vectors $w^{(k,1)}$, $w^{(k,2)}$, . . . for each subscriber station MSk, from which the weighting vector $w^{(k)}$ which is used by the multipliers M is selected.

Figures 3, 6A, 6B, 6C:
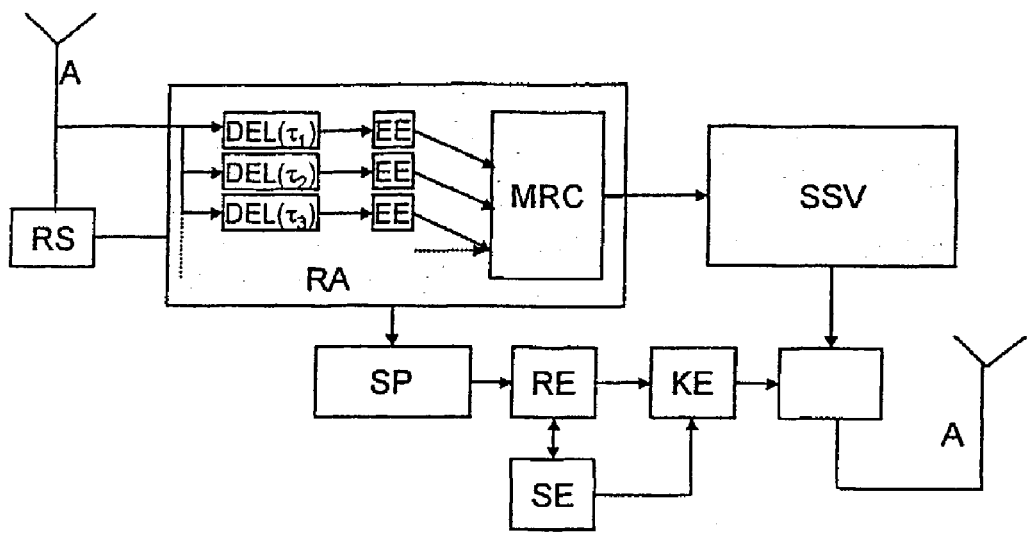
FIG. 3 shows a block diagram of the subscriber station.
FIGS. 6A, B and C show multiplex formats for the transmission of short-term and long-term feedback information.

FIG. 3 shows, schematically, the design of a subscriber station MSk for carrying out a first refinement of the method according to the invention. The subscriber station MSk has a single antenna A, which receives the downlink signal emitted from the base station BS. After being converted to baseband, the received signal is supplied from the antenna A to a so-called rake searcher RS, which is used to measure delay time differences between the components of the downlink signal, which have reached the antenna A on different propagation paths. The received signal is furthermore applied to a rake amplifier RA, which has a number of rake fingers, three of which are illustrated in the figure, and each of which has a delay element DEL and a despreader/descrambler EE. The delay elements DEL in each case delay the received signal by a delay value $\tau_1$, $\tau_2$, $\tau_3$, . . . , which is supplied by the rake searcher RS. The despreaders/descramblers EE each produce a sequence of estimated symbols at their outputs, and the results of the estimation process for the individual descramblers may be different owing to the different phase angles of the downlink signal with respect to the descrambling and spreading code in the individual fingers of the rake amplifier.

The symbol sequences produced by the despreaders/descramblers EE also include the results of the estimation of training sequences which are emitted by the base station, and which are characteristic and quasi-orthogonal for each antenna element of the base station. A signal processor SP is used to compare the results of the estimation of these training sequences with the symbols which are known to the subscriber station and are actually contained in the training sequences. This comparison can be used to determine the impulse response of the transmission channel between the base station BS and the subscriber station MSk for each individual finger or tap. The outputs of the despreaders/descrambler EE are also connected to a maximum ratio combiner MRC, which assembles the individual estimated symbol sequences to form a combined symbol sequence with the best-possible signal-to-noise ratio, which it supplies to a speech signal processing unit SSV. The method of operation of this unit SSV, which converts the received symbol sequence into a signal which is audible by a user and converts received tones to a transmission symbol sequence, is well known and does not need to be described here.

The signal processor SP determines the impulse responses of each antenna element $AE_1$, . . . , $AE_M$ individually for each tap, and combines these impulse responses in the manner which is known, for example, from the cited DE 198 03 188 to form a spatial covariance matrix, $R_{xx}$. These spatial covariance matrices are passed to a computation unit RE, whose method of operation will be described with reference to the flowchart shown in FIG. 4.

In an initialization phase 1, the computation unit RE adds a large number of supplied covariance matrices $R_{xx}$ separately for each tap and forms a mean value $\overline{R_{xx}}$ of the covariance matrices. This is followed by an analysis of the eigen values and eigen vectors of the averaged covariance matrices $\overline{R_{xx}}$ obtained for the various taps (step 2).

The analysis may extend into all the eigen vectors and values of the covariance matrix $\overline{R_{xx}}$ and, in the case under consideration here, a control unit KE determines a limited number, for example 2 or 4, of the eigen vectors found in the analysis process which have eigen values with the largest magnitudes and which in consequence correspond to the transmission paths with the least attenuation. Alternatively, it is possible to use a method for eigen vector analysis which produces the eigen vectors of the covariance matrix $\overline{R_{xx}}$ in the sequence of decreasing magnitudes of the eigen values, and which is terminated once the limited number of eigen values have been determined.

The coefficients of the determined eigen vectors $w^{(k,1)}$, $w^{(k,2)}$, . . . are combined with the user datastream coming from the speech processing unit SSV and are transmitted via the antenna A to the base station (step 4). The base station stores them in its memory unit SE for use as coefficients for the multipliers M for the beamforming network.

The computation unit RE now switches to a working phase, in which it in each case receives these covariance matrices $R_{xx}$ from the signal processor SP in each case related to an individual time slot of the subscriber station (step 5) and multiplies them by each of the eigen vectors which are stored in the memory unit and are transmitted to the base station, in order to determine the eigen values of these vectors for the relevant covariance matrix $R_{xx}$ (step 6). The number of the eigen vector which has the greater eigen value is transmitted to the base station via the control unit KE in step 7. This eigen vector is identified as dominant eigen vector since it makes the greatest contribution, and generally the best contribution, to the received signal. If only two determined eigen vectors are stored in the memory element SE and have been transmitted to the base station, one bit is sufficient to identify the eigen vector with the respectively greater eigen value. In consequence, if one bit is available per time slot for feeding back the reception characteristics to the base station, the vector which is used for beamforming by the base station can be updated in each time slot and can be used for beamforming in the next time slot.

If four eigen values have been transmitted to the base station, two bits are required to identify the respective dominant eigen vector. If one bit is available per time slot for transmitting the reception characteristics back, two time slots are thus required in order to transmit the complete identification of the dominant vector. In consequence, this is used for beamforming for the two time slots following its transmission; the identification to be used subsequently is transmitted in the course of these two slots.

The working phase steps may be repeated cyclically many times before the initialization phase need be carried out once again, in order to update the coefficients of the eigen vectors.

To assist understanding, a distinction has been drawn above between the initialization phase and the working phase. However, this does not mean that the two phases have to be carried out at separate times from one another. For example, it is possible and expedient to bracket the two phases with one another in that the computation unit RE with a received covariance matrix $R_{xx}$ firstly determines the eigen values in step 6, and secondly uses this matrix to form a running mean value $\overline{R_{xx}}$ of the covariance matrixes in step 1. This ensures that an up-to-date averaged covariance matrix $\overline{R_{xx}}$ is available at all times, and can be used to carry out the eigen value analysis in step 2.

The averaged covariance matrix $\overline{R_{xx}}$ is expediently calculated by a sliding averaging process in accordance with the following formula:

$$(\overline{R_{xx}})_i = \rho(\overline{R_{xx}})_{i-1} + (1-\rho)R_{xxi}$$

where $(\overline{R_{xx}})_i$ in each case represents the i-th averaged covariance matrix, $(R_{xx})_i$ represents the i-th up-to-date covariance matrix and $\rho$ is a measure of the time constant used for the averaging process, and having a value between 0 and 1.

If no averaged covariance matrix $\overline{R_{xx}}$ is yet available at the start of a transmission link between a subscriber station MSk and a base station BS, using which an eigen value analysis could be carried out, data can nevertheless still be transmitted. In this early phase of the transmission link, first weighting vectors defined in advance are used to weight the downlink signal instead of the determined eigen vectors. The number of these first weighting vectors determined in advance is equal to the number of eigen vectors which will be determined later and is not greater than the number of antenna elements of the base station. The first weighting vectors which are determined in advance form an orthonormal system, and may in particular be a set of vectors in the form (1, 0, 0, . . . ) (0, 1, 0, . . . ), (0, 0, 1, 0, . . . ). A choice such as this of the weighting vectors determined in advance means that each weighting vector determined in advance corresponds to the downlink signal being applied to a single antenna element. The transmission of an identification of a weighting vector to the base station thus makes it possible for the subscriber station to determine which of the number of antenna elements is being used for transmitting the downlink signal intended for it.

If the number of eigen vectors which are determined and are transmitted to the base station is two, then a single bit transmitted from the subscriber station to the base station is sufficient to specify which of these eigen vectors should be used for transmission by the base station. This bit may also be regarded as an indication of the coefficients of a linear combination of the two eigen vectors, which are either (0,1) or (1,0) depending on the value of this bit. However, it is also feasible for the base station to continually transmit downlink signals weighted with both weighting vectors, and for the relative phase angle of the two weighting vectors to be set on the basis of the short-term feedback information transmitted by the subscriber station. The linear combination coefficients and/or phase information transmitted by the subscriber station may also, of course, in each case comprise more than one bit, so that it is also possible to set intermediate values of the coefficients or of the phase shift and, if necessary, this can also be transmitted distributed over a number of time slots.

The method can be directly generalized to more than two eigen vectors; in this case, the short-term feedback information relating to the magnitude and/or phase of the individual eigen vectors can be transmitted in a predetermined sequence, which allows the base station to associate the amplitude and/or phase values with one eigen vector, or the two concepts described above may be combined, by transmitting in each case one designation of an eigen vector in conjunction with magnitude and/or phase information to the base station.

The long-term feedback information, which indicates the coefficients of the individual eigen vectors, can be transmitted to the base station via a dedicated signaling channel. However, because this is more compatible with the existing standards, it is preferable to transmit in the time-division multiplex mode with the short-term feedback information within the payload data packets.

FIGS. 6A, B and C show different formats for the multiplexed transmission of short-term and long-term feedback information within a WCDMA system. In the WCDMA Standard, each transmission frame has 15 time slots. The available feedback bit for transmitting short-term feedback information, that is to say designations of eigen vectors to be used or of relative amplitudes and phases of the downlink signals which correspond to the individual eigen vectors, is transmitted in each case fourteen of the time slots in one such frame, using the multiplex format in FIG. 6A. A long-term feedback bit is transmitted in the fifteenth frame, containing information relating to the components of the eigen vectors determined by the subscriber station. As can be seen, in this format, the transmission of the components of a single eigen vector has to occupy a large number of frames, although one designation of an eigen vector can be transmitted many times in this period. One such format is suitable for continuous operation of a link for a subscriber station which is moving relatively quickly and is subject to fast fading, but whose eigen vectors are changing only slowly.

FIG. 6B shows a second multiplex format, in which four time slots, in which short-term feedback information is transmitted, in each case alternate with one time slot for long-term feedback information. This format is suitable when fast movement of the subscriber station necessitates relatively frequent updating of the eigen vectors, but is also expedient for the initial phase of a connection, in which it is desirable after the initial calculation of a set of eigen vectors to be able to transmit these to the base station with as little delay as possible. Alternatively, it would also be possible to use a format in which in each case two time slots in which short-term feedback information is transmitted are followed by one for long-term feedback information. In comparison to other numerical relationships between time slots for short-term and long-term feedback information, both formats have the advantage that the periods of these formats, comprising 5 or 3 bits respectively, fit precisely into one time frame.

Furthermore, the formats described above have the advantage that they transmit an even number of bits of short-term feedback information in each WCDMA frame. If the number of eigen vectors which are determined and transmitted to the base station is two, that is to say the identification of an eigen vector comprises only one bit, this has no effects. However, in the practically significant situation, in which in each case four eigen vectors are transmitted to the base station and the identification which is transmitted to the base station relating to their selection by the subscriber station has a length of 2 bits, an integer number of designations thus always fits into one frame, and there is no need to combine bits transmitted in different frames to form one designation.

FIG. 6C shows a multiplex format in an upgraded sense, in which the short-term feedback information is not transmitted at all. A format such as this is particularly worthwhile for two different application situations:

Firstly, it is suitable for a completely stationary subscriber station, which is not subject to any fast fading, that is to say for a subscriber station whose current covariance matrices $R_{xx}$ are essentially constant. No short-term feedback information is required for a subscriber station such as this, and all that is desirable is that the eigen vectors which are to be used for the transmission of the downlink signal should be available to the base station as quickly as possible.

The second application situation is that of a subscriber station which is moving at extremely high speed, in which the reception qualities of individual transmission paths vary so quickly that the short-term feedback information produced by the subscriber station is already obsolete at the time when it can be used by the base station. With a station such as this, it is therefore worthwhile updating the eigen vectors as quickly as possible. The respectively best eigen vector, for example, can always be used to transmit the downlink signal, on the assumption that the reception interruptions resulting from fast fading caused by the high speed of the subscriber station never last for so long that the interruption cannot be bridged by interpolation, or a number of eigen vectors can be used at the same time.

Figure 8A:
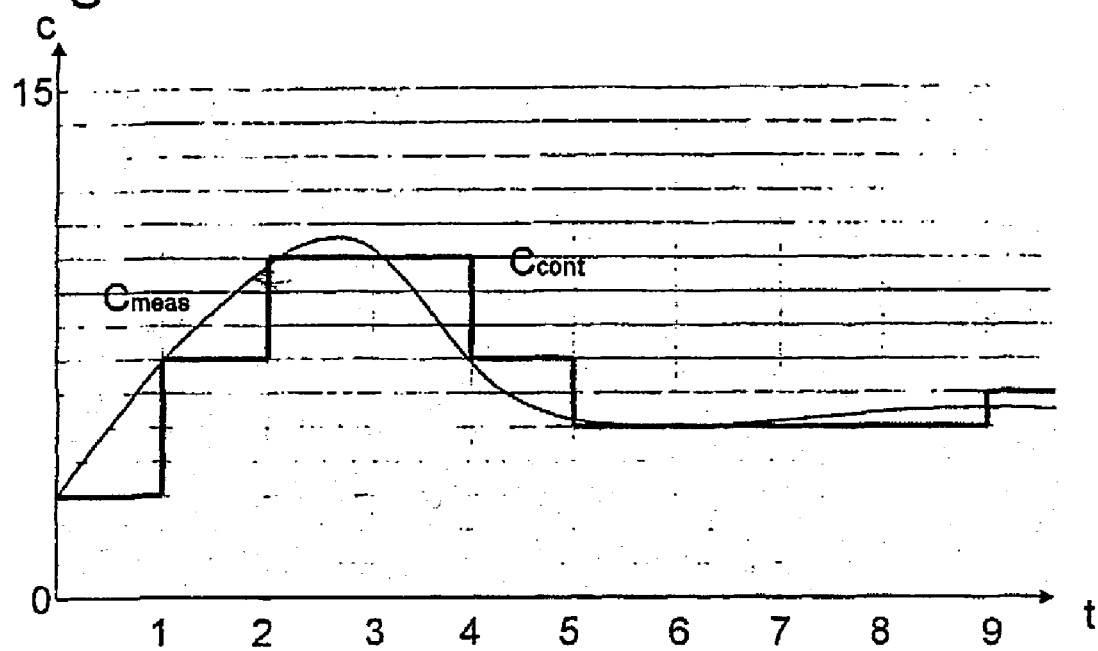
FIGS. 8A, B show the time development of a component of a weighting vector at a base station for two different methods for feeding back information relating to the components of the weighting vector to the base station.
Figure 8B:
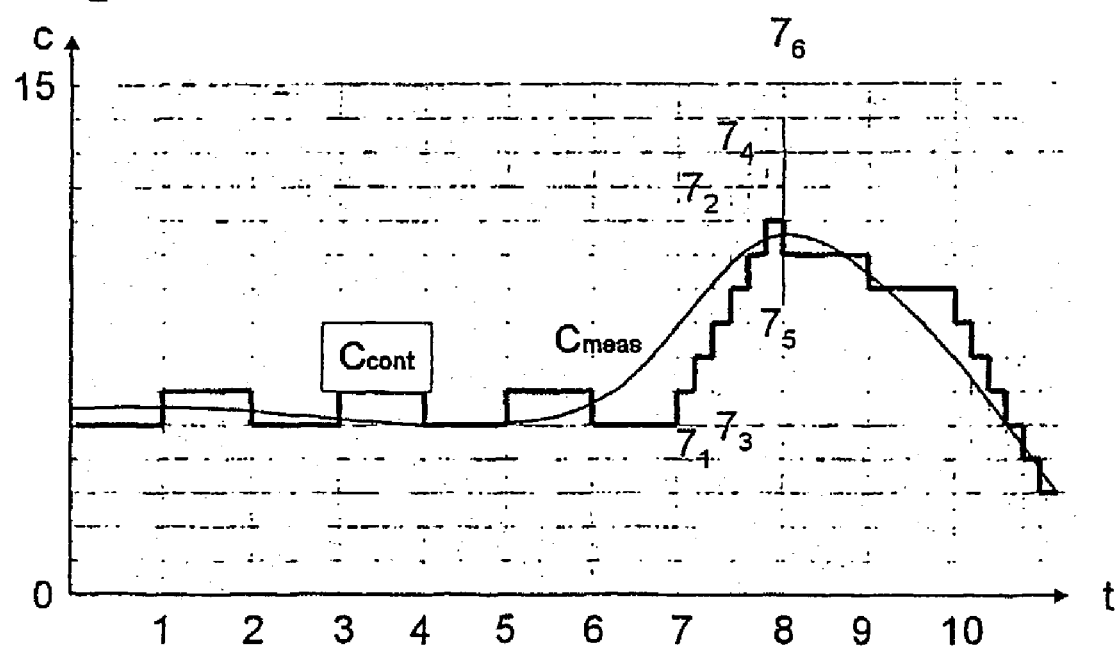

FIGS. 8A and 8B show the time development of a component c of a first weighting vector, which is used by the base station BS, for two different methods for transmission of the long-term feedback information from the subscriber station MSk to the base station BS. In this case, a thin solid line $c_{meas}$ denotes the time profile of the value of the component c measured by the subscriber station, and a thick solid line $c_{cont}$ shows the development of the value of c which is actually used by the base station for beamforming. The component c may be a real-value component of a first weighting vector, a real or imaginary part of a complex-value component, or else a magnitude component or an angle component.

Since the bandwidth available for transmission of the values of c is very limited for transmission using the time-division multiplex mode with short-term feedback information, the base station BS can in each case follow the values determined by the subscriber station MSk only with a delay that does not disappear, may amount to several time slots and, inter alia, is governed by the resolution of the transmitted long-term feedback information. However, this delay is ignored in the illustration shown in FIGS. 8A and 8B, in order to avoid unnecessarily complicating the comparison of the two methods.

As an example, it is assumed that the component c is measured and processed with a resolution of four bits.

In the situation shown in FIG. 8A, the component c starts with the value 3 at the time t=0. Initialization phases, in which the base station in each case measures the current value of c, take place at regular time intervals at the times t=1, 2, . . . , $c_{meas}$ has reached the value 7 at the time t=1. The subscriber station transmits the difference +4 between the two measured values to the base station, which then sets $c_{cont}$=7. Three bits are used for transmitting the difference, and can represent the values −3, −2, −1, 0, 1, − . . . , 4. One of the four bits is saved. The saving could be more pronounced if the time interval between two measurements of c were shorter, the difference to be transmitted were accordingly smaller, and the number of bits required to transmit this difference were less. The time intervals between the two measurements that give the greatest possible saving in transmission bandwidth in comparison to the transmission of complete numerical values of c depends on the local characteristics of the radio communications network in which the method can be implemented; if required, this can be defined dynamically, for example by switching between different multiplexing formats, described with reference to FIGS. 6A to 6C.

At the time t=2, a difference of +3 is transmitted, and $c_{cont}$ is thus set to 10. At t=3, $c_{meas}$ remains virtually unchanged and the difference 0 is transmitted; $c_{cont}$ also remains unchanged. The difference 0 is also transmitted in each case at t=6, 7, 8.

In the method shown in FIG. 8B, the subscriber station measures the current value of c ($c_{meas}$) in each initialization phase, and compares it with the value determined and stored in the previous initialization phase. The value of c at the time t=0 is approximately 5.4. The subscriber station stores the quantized value 5 for this value. $c_{meas}$ is measured to be approximately 5.5 at the time t=1. This is greater than the stored value; it therefore increments the stored value by 1 and transmits a difference +1 to the base station, which then likewise increments by 1 the value $c_{cont}$ of the component c which it uses.

At the time t=2, $c_{meas}$ is approximately 5.4; the comparison with the value stored in the subscriber station, which is now 6, results in a reduction. In consequence, the subscriber station decrements the stored value of c and transmits −1 to the base station, which likewise decrements $c_{cont}$. The value stored in the subscriber station and $c_{cont}$ are thus always the same.

At the time t=3, $c_{meas}$ has fallen to 5.2. Since the stored value is 5, an increase is nevertheless identified, and $c_{cont}$ is incremented to 6.

As can be seen, in this second method $c_{cont}$ always oscillates about $c_{meas}$ when $c_{meas}$ is changing only insignificantly. The advantage of the method is that only one bit is required for transmitting the change in $c_{cont}$ in each initialization phase, and its value is 0 or 1, depending on the mathematical sign of the change that is found. In contrast to this, in the first method, in which a change of 0 can also be transmitted, at least two bits are required in order to transmit an increase, no change or a decrease in $c_{cont}$.

After t=6, $c_{meas}$ starts to increase rapidly, and has reached the value of approximately 8 at t=7. At the same time, $c_{cont}$ can be incremented only to the value 6, and there is thus a considerable discrepancy between the two values. In order to prevent $c_{meas}$ and $c_{cont}$ from drifting apart from one another when $c_{meas}$ is changing rapidly, one aspect of the invention provides for the subscriber station to monitor the difference between the two values and, if a predetermined limit value is exceeded, to shorten the time intervals between two initialization phases. This is the situation in the example in FIG. 8B after the time t=7. $c_{cont}$ is incremented at short time intervals, until $c_{cont}$ overtakes $c_{meas}$ at the time $7_5$.

The subscriber station deduces from the decrementing of $c_{cont}$ at the time t=$7_6$=8 that the phase of the rapid rise in $c_{meas}$ has passed, and increases the time interval between two initialization phases to the original value.

A second refinement of the method according to the invention will be described with reference to FIG. 5. In this refinement, the first weighting vectors are determined on the basis of measurements of the uplink transmission from a subscriber station MSk to the base station BS. For this purpose, the base station BS is equipped with components analogous to the rake searcher RS, rake amplifier RA, signal processor SP, computation unit RE, memory element SE etc., described with reference to FIG. 3 for the subscriber station.

In step 1 of the method, the computation unit RE forms an averaged covariance matrix for each individual tap of the uplink signal, and determines the eigen vectors and eigen values of the covariance matrix obtained in this way. These eigen values in each case correspond to one transmission path and contain the information relating to the relative phase angles of the corresponding magnitude of the uplink signal to the individual antenna elements, and hence relating to the direction from which that component is received. If the frequencies of the uplink and downlink in the radio communications system under consideration are the same, the phase information contained in the eigen vector can be used directly for weighting the downlink signal. If the frequencies of the uplink and downlink are different, then it is necessary to convert the phase information contained in the eigen vector on the basis of the uplink frequency to an appropriate direction, and in turn to convert this direction on the basis of the downlink frequency to phase information, in order to obtain eigen vectors which are suitable for beamforming in the downlink.

The analysis in step 2 also includes the determination of the eigen values of the eigen vectors. The magnitude of the eigen vector is a measure of the quality of each individual transmission path; a given number of, for example, 2 or 4 eigen vectors are thus chosen for subsequent use and are stored in step 3, these being the eigen vectors whose eigen values have the highest magnitude of the eigen vectors which have been found.

In the subsequent working phase, the computation unit cyclically receives covariance matrices from the signal processor, with each covariance matrix being related to in each case one individual tap of the uplink signal. The eigen vectors which are stored in the memory unit SE themselves each correspond to one specific tap. In step 6, the computation unit determines the current eigen value for each stored eigen vector by multiplying it by the covariance matrix which is produced in step 5 and corresponds to the same tap as the eigen vector. The eigen value that is obtained provides a measure of the transmission quality on the transmission path which corresponds to that eigen vector, with a time resolution which corresponds to the rate of production of the covariance matrices in the working phase. In this phase, the covariance matrices are produced in real time in each case by the signal processor for each time slot allocated to that subscriber station; the eigen value is thus a measure of the transmission quality of the transmission path, taking account of fast fading.

In a first simple variant of the method, this is followed by a step 8 in which a current weighting vector $w^{(k)}$ is calculated by forming a linear combination of the stored eigen vectors $w^{(k,1)}$, $w^{(k,2)}$, ..., with each of the eigen vectors $w^{(k,1)}$, $w^{(k,2)}$, ... being included in the linear combination multiplied by its eigen value or its magnitude obtained in step 6. The linear combination can be normalized. This weighting in the formation of the linear combination ensures that those transmission paths which have the best transmission characteristics in the short term dominate the downlink signal which is emitted by the base station. The other eigen vectors which are included in the current weighting vector $w^{(k)}$ are used to ensure that a useable signal arrives at the subscriber station even in a situation where the most highly weighted transmission path changes from one time slot to the next.

If one of the transmission paths between the base station and the subscriber station is a direct link, then this can be identified for the base station by the fact that the corresponding component of the received uplink signal has relatively little phase fluctuation and, generally, little attenuation either. If such a direct transmission path exists, the associated eigen vector can be used directly as the current weighting vector $w^{(k)}$, in other words all the other eigen vectors are included in the formation of the linear combination with coefficients of 0.

Figure 7:
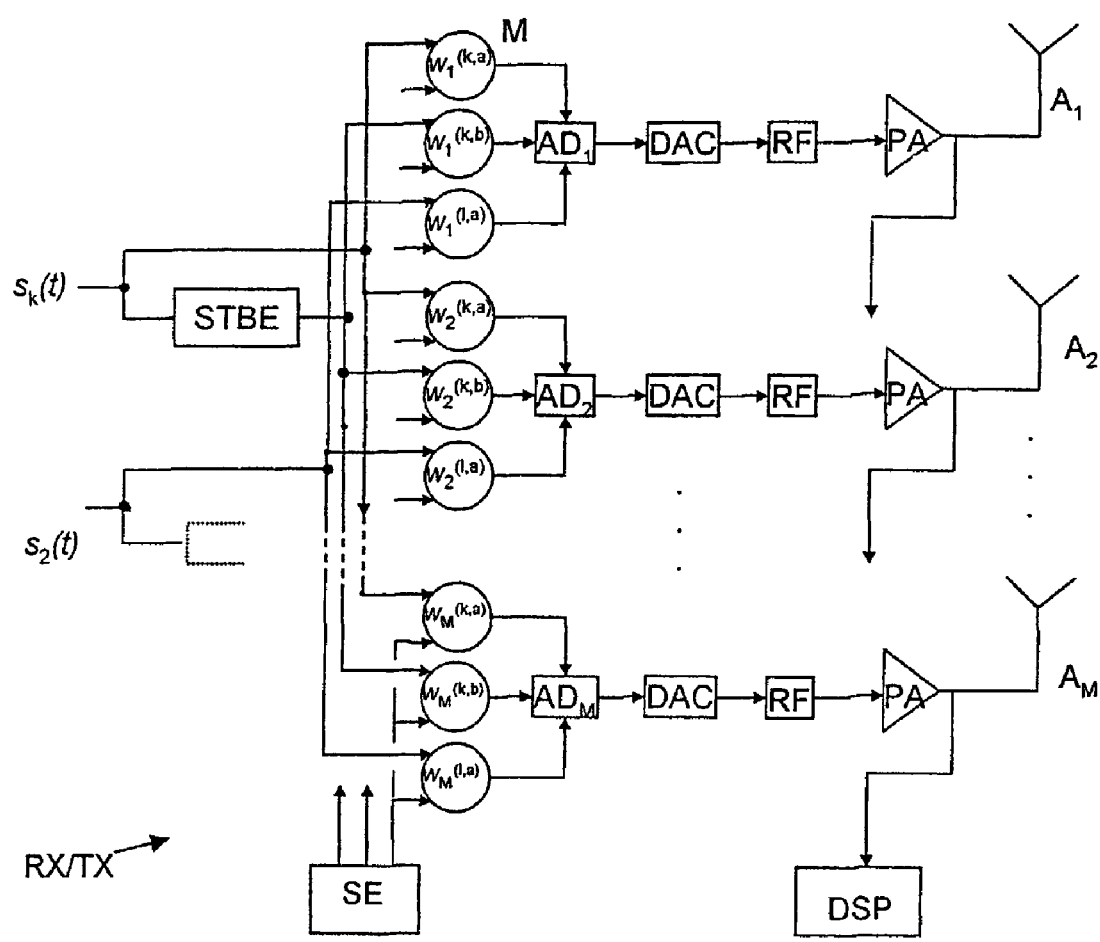
FIG. 7 shows a block diagram of a part of a transmitting/receiving device in a base station.

A further-developed variant of the refinements of the method described with reference to FIGS. 4 and 5 is predicated on a base station having an antenna device comprising a number of antenna elements, which is able to transmit using space time bock codes. Codes such as these are known, for example from Tarokh et al., Space-Time Block Codes from Orthogonal Designs, IEEE Trans. on Information Theory, Volume 45 No. 5, July 1999. A detail of the transmitting/receiving device Tx/Rx from such a base station is shown in FIG. 7. In this transmitting/receiving device, a complex-value symbol sequence which is intended for the subscriber station MSk is subdivided into two branches, one of which contains a Space Time Block Encoder STBE, which in this case reverses the sequence, conjugates and reverses the mathematical sign of one symbol of two successive symbols in the symbol sequence $s_k(t)$. The two different symbol sequences obtained in this way but having the same information content are weighted in a beamforming network, whose design is described analogously to that with reference to FIG. 2 and will therefore not be dealt with in any more detail here, with two different eigen vectors $w^{(k,a)}$, $w^{(k,b)}$ from the set of eigen vectors $w^{(k,1)}$, $w^{(k,2)}$, ... ($w^{(k,a)}=(w_1^{(k,a)}, w_2^{(k,a)}, ..., w_m^{(k,a)})$, which are additively superimposed and are transmitted. The individual antenna elements ($A_1$, ... $A_M$) are thus able to transmit a mixture of signals which have different space time block coding. The coding is thus not specific for an individual antenna element but for a propagation path a or b, which corresponds to the respective eigen vector $w^{(k,a)}$ or $w^{(k,b)}$ used for weighting. This ensures that signals which reach the subscriber station MSk on these two different transmission paths a, b can never interfere destructively even if their relative delay disappears.

In the variant of the second refinement of the method which uses this transmitting/receiving device, the step 8 of formation of a linear combination is thus replaced by the space time block coding. Apart from this, the method step corresponds; in particular, both variants have the capability to interchange those of the stored eigen vectors which are included in the linear combination or are used for weighting the space time block-coded signals, from one cycle of the working phase to the next.

Space time block codes can also be used in a base station which emits a downlink signal on three or more transmission paths which each correspond to one eigen vector. A first option for this is to use space time block codes which are known per se and allow the production of three or more symbol sequences, which do not interfere destructively, from one symbol sequence. A second, preferred option results from the fact that it is very rare for three or more transmission paths to have exactly the same delay times. The training sequences (which are not shifted in time) of the signals transmitted on these paths are orthogonal only when the delay times of these transmission paths are the same. Space time block coding is thus generally required only at times and only for two of the transmission paths in each case. The subscriber station can thus monitor the orthogonality of the downlink signals received on these transmission paths to identify when they are coincident in time and—if necessary within the short-term feedback information—the base station can in each case identify pairs of eigen vectors for which space time block coding should be used.

The use of space time block codes is in fact particularly attractive in conjunction with the use (as proposed here) of eigen vectors of the covariance matrix as weighting vectors. Since the breaking down of the eigen vectors means that the fast fading of the respective downlink beams which corresponds to one eigen vector is uncorrelated, this breaking down process also allows the diversity gain which is possible in theory by space time block codes to be fully exhausted in practice.

Modifications of the refinements described here based on the disclosure provided here are within the knowledge of those skilled in the art. In particular, a variant is conceivable in which the eigen vectors are determined on the uplink signal, as described with reference to the second refinement, and in which the determined eigen values are transmitted from the base station to the subscriber station, so that the subscriber station can carry out the steps 5 to 7, as described with reference to FIG. 4 for the first refinement of the method.

The invention has been described in detail with particular reference to preferred embodiments thereof and examples, but it will be understood that variations and modifications can be effected within the spirit and scope of the invention.

The invention claimed is:

1. A method for beamforming in a radio communications system having a plurality of subscriber stations and a base station which has an antenna device with a plurality of antenna elements $A_1$ to $A_M$, comprising:
    transmitting a downlink signal to a subscriber station from each antenna element;
    for each of the antenna elements, weighting the downlink signal transmitted thereby with a weighting coefficient $w_i$, i=1, ..., M, the weighting coefficients forming a current weighting vector;
    in an initialization phase of the subscriber station:
        producing a first spatial covariance matrix from the downlink signal,
        determining eigen vectors of the first spatial covariance matrix, and
        transmitting the eigen vectors from the subscriber station to the base station and using the eigen vectors as first weighting vectors, which correspond respectively to radiation directions of the antenna elements;
    in a working phase:
        selecting one of the first weighting vectors at the subscriber station as a currently dominant weighting vector,
        transmitting an identifier of the currently dominant weighting vector from the subscriber station to the base station, and
        using the currently dominant weighting vector to weight the downlink signal in a subsequent time slot;
    in selected time slots, sending information on components of the first weighting vector from the subscriber station to the base station, the information on components of the first weighting vector being sent instead of the identifier of the currently dominant weighting vector; and
    performing the initialization phase at greater time intervals than the working phase.

2. The method as claimed in claim 1, wherein
    the initialization phase is repeatedly performed,
    differences are determined between the weighting coefficients of a first weighting vector determined in a current initialization phase and weighting coefficients of a first weighting vector determined in a preceding initialization phase, the differences being determined at the subscriber station,
    the differences are transmitted to the base station, and
    the differences are added to corresponding weighting coefficients of the first weighting vector determined in the preceding initialization phase to thereby reproduce the weighting coefficients of the first weighting vector at the base station for the current initialization phase.

3. The method as claimed in claim 2, wherein
    a second spatial covariance matrix is produced cyclically in the working phase,
    eigen vectors are determined for the second spatial covariance matrix, and
    the eigen vector which has the largest eigen value is selected and used as the weighting vector.

4. The method as claimed in claim 3, wherein
    each antenna element periodically emits a training sequence which is orthogonal to the training sequences of the other antenna elements, and
    the first weighting vectors are determined on the basis of the training sequences received by the subscriber station.

5. The method as claimed in claim 4, wherein
    the number of first weighting vectors is two, and
    the identification of the dominant weighting vector is transmitted in each time slot allocated to the subscriber station.

6. The method as claimed in claim 5, wherein
    the number of first weighting vectors is $2^n$,
    the identification of the dominant weighting vector comprises n bits, and
    the n bits are divided with portions of the n bits being transmitted respectively in time slots allocated to the subscriber station.

7. The method as claimed in claim 6, wherein the current weighting vector is a linear combination of the first weighting vectors.

8. The method as claimed in claim 7, wherein
    a plurality of downlink signals, which each have a different space time block coding, are produced from a symbol sequence which is intended for the subscriber station, and
    each of the downlink signals is weighted with a different current weighting vector.

9. The method as claimed in claim 8, wherein the current weighting vector is chosen from the first weighting vectors when an LOS transmission path exists between the base station and the subscriber station.

10. The method as claimed in claim 9, wherein, before completing a process of determining the first weighting vectors, the current weighting vector, which is used for transmitting the downlink signal during a time slot, is defined on the basis of the previously defined weighting vectors.

11. The method as claimed in claim 1, wherein
    the initialization phase is repeatedly performed,
    the subscriber station determines mathematical signs of the differences between the weighting coefficients of a first weighting vector determined in a current initialization phase and weighting coefficients of a first weighting vector determined in a preceding initialization phase,
    the mathematical signs are transmitted to the base station, and
    the coefficients of the first weighting vector determined in the preceding phase are incremented or decremented by one unit depending on the corresponding mathematical sign.

12. The method as claimed in claim 1, wherein
    the subscriber station receives taps of the downlink signal corresponding to the antenna elements of the antenna device, and the first spatial covariance matrix is produced individually for each tap of the downlink signal.

13. The method as claimed in claim 1, wherein
a selected portion of the eigen vectors of the first spatial covariance matrix are used as the first weighting vectors, and
the eigen vectors which are selected and used are the eigen vectors which have the largest eigen values.

14. The method as claimed in claim 1, wherein the first spatial covariance matrix is averaged over a plurality of time slots of the downlink signal.

15. The method as claimed in claim 1, wherein
a second spatial covariance matrix is produced cyclically in the working phase,
eigen vectors are determined for the second spatial covariance matrix, and
the eigen vector which has the largest eigen value is selected and used as the weighting vector.

16. The method as claimed in claim 1, wherein
each antenna element periodically emits a training sequence which is orthogonal to the training sequences of the other antenna elements, and
the first weighting vectors are determined on the basis of the training sequences received by the subscriber station.

17. The method as claimed in claim 1, wherein
the number of first weighting vectors is two, and
the identification of the dominant weighting vector is transmitted in each time slot allocated to the subscriber station.

18. The method as claimed in claim 1, wherein
the number of first weighting vectors is $2^n$,
the identification of the dominant weighting vector comprises n bits, and
the n bits are divided with portions of the n bits being transmitted respectively in time slots allocated to the subscriber station.

19. The method as claimed in claim 18, wherein the dominant weighting vector is used for beamforming in the time slot immediately following its transmission.

20. The method as claimed in claim 18, wherein
a bits are allocated to the subscriber station per time slot, and
the n bits are inserted into n/a time slots.

21. The method as claimed in claim 1, wherein the number of time slots used to transmit weighting vector information is varied as a function of speed of movement of the subscriber station.

22. The method as claimed in claim 1, wherein the current weighting vector is a linear combination of the first weighting vectors.

23. The method as claimed in claim 22, wherein
the current weighting vector is a linear combination of the first weighting vectors, and
in the operating phase, the subscriber station transmits to the base station information relating to coefficients of the linear combination.

24. The method as claimed in claim 23, wherein the information indicates at least one of a phase and a magnitude of one of the coefficients of the linear combination.

25. The method as claimed in claim 22, wherein the coefficients of the linear combination of first weighting vectors have magnitudes respective to magnitudes of respective eigen values.

26. The method as claimed in claim 1, wherein
a plurality of downlink signals, which each have a different space time block coding, are produced from a symbol sequence which is intended for the subscriber station, and
each of the downlink signals is weighted with a different current weighting vector.

27. The method as claimed in claim 1, wherein the current weighting vector is chosen from the first weighting vectors when an LOS transmission path exists between the base station and the subscriber station.

28. The method as claimed in claim 1, wherein, before completing a process of determining the first weighting vectors, the current weighting vector, which is used for transmitting the downlink signal during a time slot, is defined on the basis of the previously defined weighting vectors.

29. The method as claimed in claim 28, wherein the previously defined weighting vectors each have one, and only one, non-vanishing component.

* * * * *